(12) United States Patent
Zheng

(10) Patent No.: US 9,723,378 B2
(45) Date of Patent: Aug. 1, 2017

(54) METHOD AND SYSTEM FOR INTEGRATING SMART TV PROGRAM CHANNELS WITH APPLICATIONS

(71) Applicant: HUIZHOU TCL MOBILE COMMUNICATION CO., LTD., Huizhou (CN)

(72) Inventor: Yu Zheng, Huizhou (CN)

(73) Assignee: HUIZHOU TCL MOBILE COMMUNICATION CO., LTD., Huizhou, Guangdong (CN)

( * ) Notice: Subject to any disclaimer, the term of this patent is extended or adjusted under 35 U.S.C. 154(b) by 10 days.

(21) Appl. No.: 14/770,309

(22) PCT Filed: Jun. 4, 2014

(86) PCT No.: PCT/CN2014/079129
§ 371 (c)(1),
(2) Date: Aug. 25, 2015

(87) PCT Pub. No.: WO2015/135261
PCT Pub. Date: Sep. 17, 2015

(65) Prior Publication Data
US 2016/0255418 A1 Sep. 1, 2016

(30) Foreign Application Priority Data

Mar. 11, 2014 (CN) .......................... 2014 1 0087154

(51) Int. Cl.
*H04N 5/445* (2011.01)
*H04N 21/8545* (2011.01)
(Continued)

(52) U.S. Cl.
CPC ..... *H04N 21/8545* (2013.01); *H04N 21/4345* (2013.01); *H04N 21/482* (2013.01); *H04N 21/8173* (2013.01)

(58) Field of Classification Search
CPC ....................... H04N 21/2665; H04N 21/4622
See application file for complete search history.

(56) References Cited

U.S. PATENT DOCUMENTS 6,198,509 B1 * 3/2001 Dougherty ............ H03J 1/0008
348/461
8,627,507 B2 * 1/2014 Stasi .................. G06Q 10/0637
725/63
(Continued)

FOREIGN PATENT DOCUMENTS

CN 1968400 A 5/2007
CN 101374214 A 2/2009
(Continued)

*Primary Examiner* — Fernando Alcon
(74) *Attorney, Agent, or Firm* — Shimokaji IP

(57) ABSTRACT

A method and a system are provided for achieving integration of smart TV program channels with applications. The method may include performing normalization processing on data of TV program channel information, maintaining a data structure for each TV program channel, and obtaining a program table with items thereof being the information of multiple TV program channels. The method may also include performing normalization processing on data of application information, maintaining a data structure for each application, and obtaining an application table with items thereof being information of multiple applications. The method may further include mixing and arranging items in the program table and the application table to obtain a mixed table and, upon receiving a control command, looking for an item corresponding to said control command in said mixed table and displaying the corresponding content.

17 Claims, 1 Drawing Sheet

(51) Int. Cl.
　　　 *H04N 21/482* (2011.01)
　　　 *H04N 21/434* (2011.01)
　　　 *H04N 21/81* (2011.01)

(56) References Cited

U.S. PATENT DOCUMENTS

| | | | |
|---|---|---|---|
| 9,124,931 B2* | 9/2015 | Ozawa | H04N 21/433 |
| 9,319,735 B2* | 4/2016 | Knee | H04N 21/4325 |
| 2003/0041104 A1* | 2/2003 | Wingard | H04N 5/44543 |
| | | | 709/203 |
| 2006/0225107 A1* | 10/2006 | Seetharaman | G06F 9/485 |
| | | | 725/100 |
| 2014/0173659 A1* | 6/2014 | Park | H04N 21/4622 |
| | | | 725/40 |

FOREIGN PATENT DOCUMENTS

| | | |
|---|---|---|
| CN | 102016908 A | 4/2011 |
| CN | 102802087 A | 11/2012 |
| CN | 103596020 A | 2/2014 |

\* cited by examiner

METHOD AND SYSTEM FOR INTEGRATING SMART TV PROGRAM CHANNELS WITH APPLICATIONS

TECHNICAL FIELD

The present disclosure relates to the field of smart TV software. More particularly, the present disclosure relates to a method and a system for achieving integration of smart TV program channels with applications.

BACKGROUND

Along with continuous progress of science and technology, development of smart TVs has become increasingly rapid. There are more and more apparatuses capable of achieving most functions of smart TVs, such as set-top boxes, multimedia boxes and family gateways. With these apparatuses, it is very easy to change a regular TV to a smart TV and achieve smart TV functions. As an important media expression tool for families, smart TVs will exist for a long time. Currently in the TV industry, the basic behavior of TV apparatuses, i.e. the mode of remote control plus screen (which, of course, may also comprise other auxiliary equipment and remote controls) will also exist for a fairly long time. In any event, users are generally unable to be fully accustomed to using a smart TV to switch applications, and existing smart TVs are unable to provide capabilities of integrating TV program channels with applications to meet user demand.

Therefore, the prior art is still in need of improvement and development.

SUMMARY

An object of the present invention is to provide a method and a system for achieving integration of smart TV program channels with applications to solve the problem that existing smart TVs are unable to integrate TV program channels with applications.

A method for achieving integration of smart TV program channels with applications includes performing normalization processing on TV program channel information data, maintaining a data structure for each TV program channel, and obtaining a program table with program table items being representative of information of multiple TV program channels; performing normalization processing on application information data, maintaining a data structure for each application, and obtaining an application table with application table items being representative of information of multiple applications; mixing and arranging the program table items and the application table items to obtain a mixed table; and upon receiving a control command, searching for an item corresponding to said control command in said mixed table and displaying corresponding content.

In another embodiment, a method for achieving integration of smart TV program channels with applications includes a data structure of TV program channels that comprises at least three member variables including: a channel identification, a channel number and a channel auxiliary information.

In a further embodiment, a method for achieving integration of smart TV program channels with applications includes a data structure of applications that comprises at least two member variables including: an application name and an application calling parameter.

In yet another embodiment, a method for achieving integration of smart TV program channels with applications includes mixing and arranging program table items and application table items to obtain a mixed table, rules of mixing and arranging program table items and application table items includes: the program table items are arranged in a front position and the application table items are arranged in a back position; the application table items are arranged in front of the program table items the program table items and the application table items are arranged randomly in a mixed manner; according to an actual use frequency of users, items with high actual use frequency are arranged in a front position; an arrangement in an order or a reverse order of a time sequence that TV program channels and applications appear, or an order of items in the mixed table is adjusted by a control program at a remote service backend.

In yet a further embodiment, a method for achieving integration of smart TV program channels with applications, includes, when an application has a data combination of a variety of application calling parameters, a plurality of items are recorded in an application table that correspond to different application calling parameters in the data combination.

In another embodiment, a method for achieving integration of smart TV program channels with applications includes a data structure of TV program channels that comprises one or more member variables including: a channel name, a channel description, a channel content prompt and a program guide.

In further embodiment, a method for achieving integration of smart TV program channels with applications includes a data structure of applications that comprises calling an entry point, a type name, a registered name in an operating system, and a program file name.

In yet another embodiment, a method for achieving integration of smart TV program channels with applications including a mixed table, wherein each item has a mixing index number and corresponding channel property information, said mixing index number being used to label the content of said item.

In yet a further embodiment, a method for achieving integration of smart TV program channels with applications includes, upon receiving a control command, querying a mixing index number corresponding to a control command, and querying items in a mixed table according to the mixing index number, if said item records the information of a TV program channel, then displaying the corresponding TV program channel, if said item records the information of an application, then running the corresponding application through the application name and application calling parameters in the item, and displaying the application.

In another embodiment, a system for achieving integration of smart TV program channels with applications includes a program table creation module for performing normalization processing on TV program channel information data, maintaining a data structure for each TV program channel, and obtaining a program table with program table items being representative of information of multiple TV program channels; an application table creation module for performing normalization processing on application information data, maintaining a data structure for each application, and obtaining an application table with application table items being representative of information of multiple applications; a mixed table creation module for mixing and arranging the program table items and the application table items to obtain a mixed table; a display module for, upon receiving a control command, searching for an item corresponding to said control command in said mixed table and displaying corresponding content.

In a further embodiment, a program table and an application table are set up, respectively, the program table is used to record information of multiple TV program channels, the application table is used to record information of multiple applications, and program table items and application table items are mixed and arranged to obtain a mixed table, thereby effectively integrating TV program channels and applications. In such a way, a user may use a conventional way of transmitting control commands like channel selection for rapid switch between applications and TV programs when using a smart TV, which facilitates user operations and use, makes the smart TV comply with the user's use habits, and makes it easier to transition to scenarios of using smart TVs such that more users are able to conveniently make use of the rich functions of smart TVs.

DETAILED DESCRIPTION

A method and a system for achieving integration of smart TV program channels with applications is described in detail below. It should be understood that the exemplary embodiments described herein are for illustrative purposes. The exemplary embodiments are not intended to limit the present invention in any way.

Figure 1:
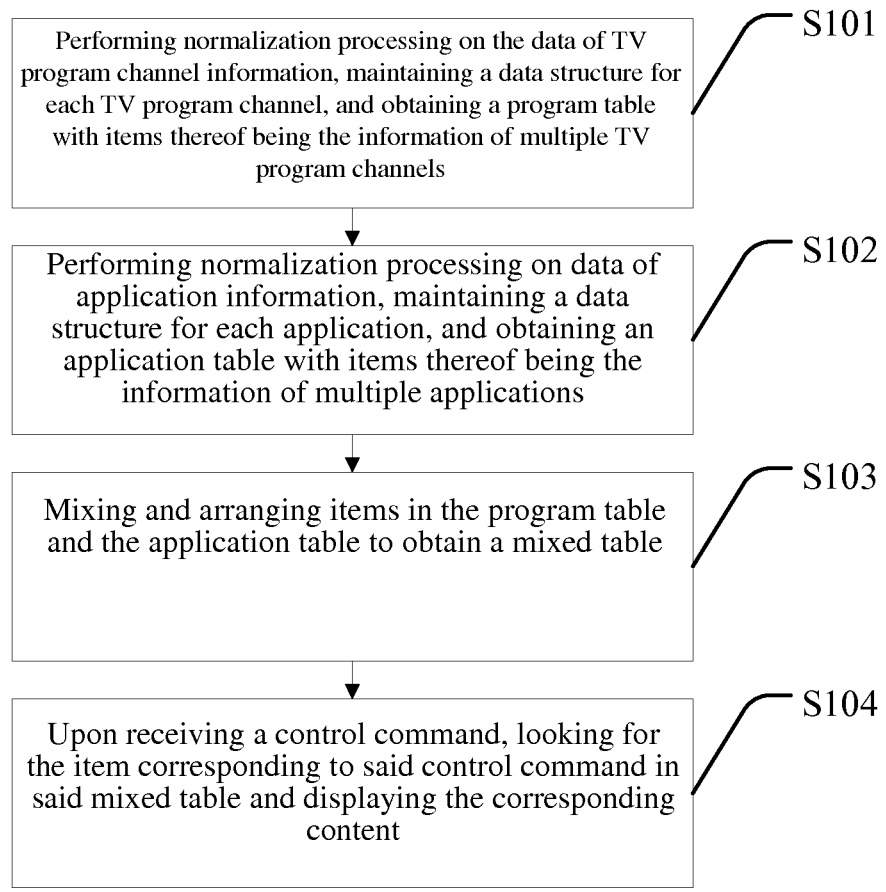
FIG. 1 depicts a flow chart of an exemplary method for achieving integration of smart TV program channels with applications according to the present invention.

With reference to FIG. 1, a flow chart of an exemplary embodiment of a method for achieving integration of smart TV program channels with applications according to the present invention may include performing normalization processing on TV program channel information data, maintaining a data structure for each TV program channel, and obtaining a program table with program table items being representative of information of multiple TV program channels (block S101). The method may also include performing normalization processing on application information data, maintaining a data structure for each application, and obtaining an application table with application table items being representative of information of multiple applications (block S102). The method may further include mixing and arranging the program table items and the application table items to obtain a mixed table (block S103) and, upon receiving a control command, searching for an item corresponding to the control command in the mixed table and displaying the corresponding content.

It should be noted that the block numbers included in the exemplary embodiments are provided for the purpose of description, and shall not be construed as limiting the claimed invention in any way.

Based on existing architecture of conventional TVs, radio TVs, IP TVs and set-top box systems, performing normalization processing on TV program channel information data, maintaining a data structure for each TV program channel (including static channel and dynamic channel), and consequently obtaining an application table with application table items being representative of information of multiple TV program channels, i.e. each application table item corresponding to the information of one TV program channel, the data structure of the TV program channel information may include at least three properties: a channel identification, a channel number and channel auxiliary information. Each application table item may correspond to the above three types of information of one TV program channel, among which the channel identification may be label information or a key recognition technical parameter of each program channel in a conventional TV, a radio TV, an IP TV and a set-top box. The channel number may be an identification information code designated by a broadcasting system or a backend service system to a program channel, and the channel auxiliary information may refer to other technical information for describing the TV program channel. In addition, the data structure of the TV program channel information may further include a channel name, a channel description, a channel content prompt, a program guide. The information of at least one other channel may be dynamically updated. Moreover, the data structure may further include other more expanded member variables, from which one or more may be selected to add into the data structure.

Subsequent to normalization, a program table with program table items being representative of information of multiple TV program channels can be obtained. A length of the program table may be variable, and each TV program may correspond to one item, and the items may record the TV program channel information described by the above data structure.

In addition to setting TV program channels in a unified format, relevant information, properties and contents of applications may also be managed. The following data structure may be used to record applications set on smart devices. The data structure may include at least two member variables including: an application name and an application calling parameter. The application name may be application registration information required by the operating system to execute the application during running, specifically including but not limited to: an application calling entry point, a type name, a registered name of the program in the operating system, and a program file name. The application calling parameter may refer to parameter information that may be needed or may be required to implement a start or calling of an application with parameters. Since parameter structures and numbers may be different when different applications start, member variables of the application calling parameter may be complex data, which may vary depending on, for example, the operating system and operating environment. When an application has a data combination of a variety of application calling parameters, a plurality of items may be recorded in the application table that correspond to different application calling parameters in the data combination. In addition, the data structure of an application may further include program history calling information, a program running state, a program home subscriber, a program multi-access authority or attribute, and program limiting conditions, etc. These optional parameters may all become member variables of the data structure of an application. For example, one or more member variables may be selected for addition into the data structure.

Subsequent to normalization, an application table with application table items being representative of information of multiple applications can be obtained. A length of the program table may be variable, each application may correspond to one or more items, and the items may record the application information described by the above data structure.

To mix various TV program channels and application channels for displaying on a user interface and application in a user operation process, the exemplary embodiments may mix and arrange items in the program table and the application table to obtain a mixed table. In the mixed table, each item may include a mixing index number and corresponding channel property information. The channel property information may be the above TV program channel information or application information, i.e. each item may record either the data structure of the TV program channel information or the data structure of the application information. The mixing index number may be used for display on an user interface to end users, and for reference and operations by end users via a menu, remote control or similar accessory, remote control program, machine button, etc., and the mixed table may further include other optional member variables to assist item management.

Channels, as the term is used herein, may refer to content identifications or operation units in the devices that are number coded to a user in software and user interfaces running in TV devices, IP TV terminal devices, computer devices, set-top boxes, network multimedia boxes, family gateway devices, and/or business and family multimedia gateway devices. In other words, the channels may refer to content or function that a user may directly access by inputting or adjusting numbers representing channel numbers through remote control or similar accessories, remote control software, menu or buttons on devices, etc. In particular, a channel may include TV program channels and applications. In other words, when using a smart TV, a user may use a conventional remote control to select channel numbers, thereby, entering various TV program channels or applications, which may, for example, truly achieve integration of TV program channels with applications. Channel management of conventional TVs and radio TVs, may be improved, such that the smart TV may become a more flexible device that may be easy to use, and which may lower a threshold to use the associated smart TV. To elderly people and children, in particular, they can use expanded functions on smart devices without complex operations and settings, which may greatly improve the convenience of use and operations.

Mixing and arranging, as the terms are used herein, may refer to mixing and arranging program table items and application table items in the mixed table. A variety of ways for mixing and arranging are included herein, for example, the program table items may be arranged in front and the application table items; the application table items may be arranged in front of the program table items; the program table items and the application table items may be arranged randomly in a mixed manner; according to an actual use frequency of users, items with high actual use frequency may be arranged in a front; an arrangement in an order or reverse order of a time sequence that TV program channels and applications appear (time sequence of use), or an order of items in the mixed table may be adjusted by a control program at the remote service backend. In any event, all of these may achieve mixing and arranging of the program table items and the application table items. Alternatively, the way of mixing and arranging of the program table items and the application table items may also be set according to a user's preference. For example, statistics may be collected of a time (or actual use frequency) that a user watches TV programs and uses applications, and TV program channels may be arranged with a longest watching time (high actual use frequency) in front, arrange applications with the longest use time (high actual use frequency) in front. A priority of TV program channels may be higher than that of applications, and at the same time, an order of items in the mixed table may be adjusted by a user or by a control program at the remote service backend, and the order may be adjusted in real time by remote commands. For example, statistics may be collected of the time that a user watches TV program channels and uses applications within one week, and TV program channels with the longest watching time may be arranged in front, applications with the longest use time may be arranged in a front, or an application may be recommended to users and may be designated ad hoc during a channel gap, etc.

When the mixed table is obtained, if a control command of a channel selection is received from a user, for example, the user may enter different channel numbers with a remote control, which may query the mixing index number corresponding to the control command, and may query items in the mixed table according to the mixing index number. If the item records the information of a TV program channel, the device may display the corresponding TV program channel. If the item records the information of an application, the device may run or call the application through the application name and application calling parameters in the item, and at the same time, may switch device resources, such as display and calculation, to the application so as to satisfy the use by the application.

Figure 2:
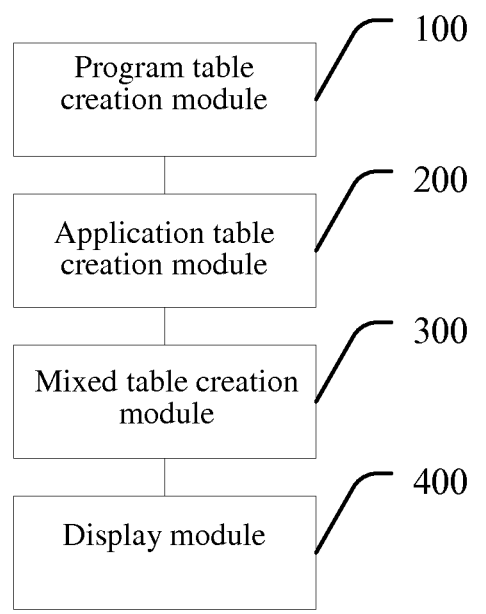
FIG. 2 depicts a structural block diagram of an exemplary system for achieving integration of smart TV program channels with applications according to the present invention.

Based on the above method, a system for achieving integration of smart TV program channels with applications, as shown in FIG. 2, may include a program table creation module 100 for performing normalization processing on TV program channel information data, maintaining a data structure for each TV program channel, and obtaining a program table with program table items being representative of information of multiple TV program channels. The system may also include an application table creation module 200 for performing normalization processing on application information data, maintaining a data structure for each application, and obtaining an application table with application table items thereof being representative of information of multiple applications. The system may further include a mixed table creation module 300 for mixing and arranging the program table items and the application table items to obtain a mixed table. The system may also include a display module 400 for, upon receiving a control command, searching for an item corresponding to the control command in the mixed table and displaying the corresponding content.

In summary, a program table and an application table may be set up, respectively, the program table may be used to record information of multiple TV program channels, the application table may be used to record information of multiple applications, and program table items and application table items may be mixed and arranged to obtain a mixed table, thereby effectively integrating TV program channels and applications. In such a way, a user may use a conventional way of transmitting control commands like channel selection for rapid switch between applications and TV programs when using a smart TV, which facilitates user operations and use, makes the smart TV comply with the user's use habits, and makes it easier to transition to scenarios of using smart TVs such that more users are able to conveniently make use of the rich functions of smart TVs.

It should be understood that applications of the present invention are not limited to the above examples. To those skilled in the art, improvements or modifications may be made according to the above description, and all of these improvements or modifications shall be encompassed by the appended claims.

The invention claimed is:

1. A method for achieving integration of smart TV program channels with applications, the method comprising:
performing normalization processing on TV program channel information data on a smart TV, maintaining a data structure for each TV program channel, and obtaining a program table with program table items being representative of information of multiple TV program channels;
performing normalization processing on application information data, maintaining a data structure for each application, and obtaining an application table with application table items being representative of information of multiple applications;
mixing and arranging the program table items in the program table and the application table items to obtain a mixed table; and
upon receiving a control command, searching an item corresponding to said control command in said mixed table and displaying corresponding content;
wherein the data structure for each application comprises at least two member variables including: an application name and an application calling parameter; and
wherein the data structure for each application further comprises calling an entry point, a type name, a registered name in an operating system, and a program file name.

2. The method for achieving integration of smart TV program channels with applications according to claim 1, wherein the data structure of TV program channels comprises at least three member variables including: a channel identification, a channel number and a channel auxiliary information.

3. The method for achieving integration of smart TV program channels with applications according to claim 2, wherein the channel identification is label information or a key recognition technical parameter of each program channel in a conventional TV, a radio TV, an IP TV and a set-top box; the channel number is an identification information code designated by a broadcasting system or a backend service system to a program channel; and the channel auxiliary information refers to other technical information describing the TV program channel.

4. The method for achieving integration of smart TV program channels with applications according to claim 3, wherein, when an application has a data combination of a variety of application calling parameters, a plurality of items are recorded in the application table that correspond to different application calling parameters in the data combination.

5. The method for achieving integration of smart TV program channels with applications according to claim 2, wherein the data structure of TV program channels further comprises one or more member variables including: a channel name, a channel description, a channel content prompt and a program guide.

6. The method for achieving integration of smart TV program channels with applications according to claim 1, wherein, in the mixed table, each item has a mixing index number and corresponding channel property information, said mixing index number being used to label the content of said item.

7. The method for achieving integration of smart TV program channels with applications according to claim 6, wherein, upon receiving a control command, querying the mixing index number corresponding to said control command, and querying items in the mixed table according to the mixing index number if said item records the information of a TV program channel, then displaying the corresponding TV program channel if said item records the information of an application, then running the corresponding application through the application name and application calling parameters in the item, and displaying the application.

8. A method for achieving integration of smart TV program channels with applications, the method comprising:
performing normalization processing on TV program channel information data on a smart TV, maintaining a data structure for each TV program channel, and obtaining a program table with program table items thereof being representative of information of multiple TV program channels;
performing normalization processing on application information data, maintaining a data structure for each application, and obtaining an application table with application table items being representative of information of multiple applications;
mixing and arranging the program table items and the application table items to obtain a mixed table; and
upon receiving a control command, searching for an item corresponding to said control command in said mixed table and displaying the corresponding content;
wherein rules of mixing and arranging program table items and application table items includes: the program table items are arranged in front of the application table items; the application table items are arranged in the front of the program table items; the program table items and the application table items are arranged randomly in a mixed manner; according to an actual use frequency of users, items with high actual use frequency are arranged in a front position; an arrangement in an order or a reverse order of a time sequence that TV program channels and applications appear, or an order of items in the mixed table is adjusted by a control program at a remote service backend,
wherein the data structure for each application further comprises calling an entry point, a type name, a registered name in an operating system, and a program file name.

9. The method for achieving integration of smart TV program channels with applications according to claim 8, wherein the data structure of TV program channels comprises at least three member variables including: a channel identification, a channel number and a channel auxiliary information.

10. The method for achieving integration of smart TV program channels with applications according to claim 9, wherein the channel identification is label information or a key recognition technical parameter of each program channel in a conventional TV, a radio TV, an IP TV and a set-top box; the channel number is an identification information code designated by a broadcasting system or a backend service system to a program channel; and the channel auxiliary information refers to other technical information describing the TV program channel.

11. The method for achieving integration of smart TV program channels with applications according to claim 8, wherein the data structure of applications comprises at least two member variables including: an application name and an application calling parameter.

12. The method for achieving integration of smart TV program channels with applications according to claim 11, wherein, when an application has a data combination of a variety of application calling parameters, a plurality of items are recorded in the application table that correspond to different application calling parameters in the data combination.

13. The method for achieving integration of smart TV program channels with applications according to claim 9, wherein the data structure of TV program channels further comprises one or more member variables including: a channel name, a channel description, a channel content prompt and a program guide.

14. The method for achieving integration of smart TV program channels with applications according to claim 8, wherein, in the mixed table, each item has a mixing index number and corresponding channel property information, said mixing index number being used to label the content of said item.

15. The method for achieving integration of smart TV program channels with applications according to claim 14, wherein, upon receiving a control command, querying the mixing index number corresponding to said control command, and querying items in the mixed table according to the mixing index number if said item records the information of a TV program channel, then displaying the corresponding TV program channel if said item records the information of an application, then running the corresponding application through the application name and application calling parameters in the item, and displaying the application.

16. A system for achieving integration of smart TV program channels with applications, comprising:
a smart TV;
a computer processor on the smart TV, wherein the computer processor is configured to:
perform normalization processing on TV program channel information data, maintaining a data structure for each TV program channel, and obtaining a program table with program table items being representative of information of multiple TV program channels;
perform normalization processing on application information data, maintaining a data structure for each application, and obtaining an application table with application table items thereof being representative of information of multiple applications;
mix and arrange the program table items and the application table items to obtain a mixed table;
search for an item corresponding to said control command in said mixed table and displaying corresponding content,
wherein the data structure for each application further comprises calling an entry point, a type name, a registered name in an operating system, and a program file name.

17. The system of claim 16, wherein rules of mixing and arranging program table items and application table items includes: the program table items are arranged in a front position and the application table items are arranged in a back position; the program table items and the application table items are arranged randomly in a mixed manner; according to an actual use frequency of users, items with high actual use frequency are arranged in a front position; an arrangement in an order or a reverse order of a time sequence that TV program channels and applications appear, or an order of items in the mixed table is adjusted by a control program at a remote service backend.

* * * * *